L. W. WRIGHT.
Ordnance.
No. 55,193.
Patented May 29, 1866.
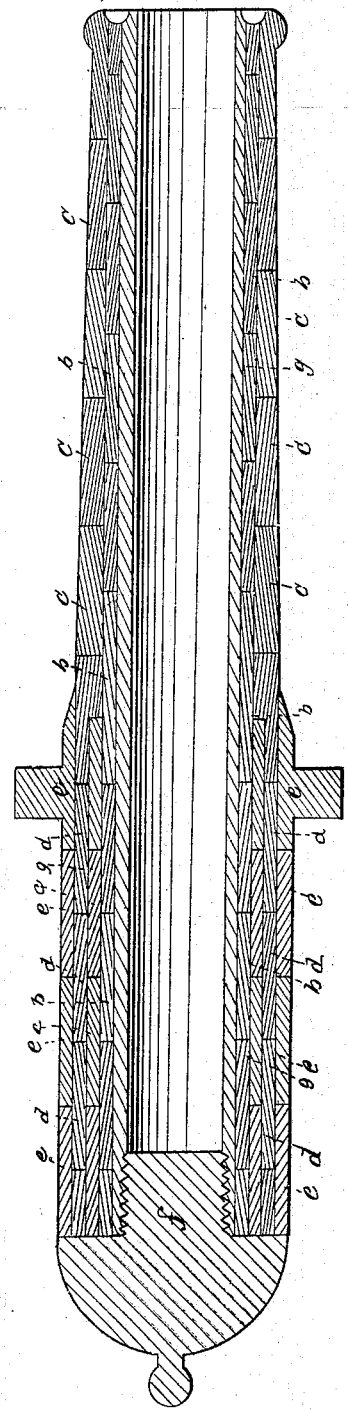
Witnesses:
F. P. Hale Jr
Frederick Curtis
Inventor:
Lemuel W Wright

UNITED STATES PATENT OFFICE.

LEMUEL WELLMAN WRIGHT, OF THORNDIKE, MASSACHUSETTS.

IMPROVEMENT IN ORDNANCE.

Specification forming part of Letters Patent No. 55,193, dated May 29, 1866; antedated May 16, 1866.

*To all whom it may concern:*

Be it known that I, LEMUEL WELLMAN WRIGHT, a resident of Thorndike, in the county of Hampden and State of Massachusetts, have made a new and useful invention having reference to Cannon or Ordnance; and I do hereby declare the same to be fully described in the following specification and represented in the accompanying drawing, which denotes a longitudinal section of a cannon made in accordance with my invention.

The nature of my said invention consists in a series of concentric cylinders of wrought iron or steel brazed together to form a cannon in the manner hereafter shown.

In carrying out my invention, or, in other words, constructing a piece of ordnance in my improved manner, I first make a cylinder or tube, $a$, of wrought iron or steel, of a proper length and thickness, according to the size of the gun I intend to make. Next, I form a series, $b\ b$, &c., of rings or tubes, of twelve inches in length, more or less, from rolled-iron plates, and place such tubes concentrically upon the central tube, $a$, the said tubes $b$ having such an internal diameter as to be easily slipped upon such tube $a$. I next make another series, $c\ c$, &c., of tubes, of an internal diameter sufficient to allow them to be slipped upon the former series, and so dispose them as to cause the latter to break joints with them. This operation I repeat with series $d\ d$, &c., $e\ e$, &c., of larger tubes until I have acquired the proper thickness for the gun. These tubes should all be lap-welded.

I make the breech $f$ of the gun of solid iron or steel, and with a boss to fit into the central tube or cylinder, such boss having a male screw formed upon it to screw into a female screw made on the inner surface of the tube $a$, as shown in the drawing. I next put on a tube or ring, $e$, having the trunnions welded to it. This having been accomplished, I next "pickle" the mass or series of tubes in diluted sulphuric acid, for the purpose of cleaning the surfaces of the tubes from oxide, scales, and other impurities. Next I place the embryo gun in a vertical position on a movable truck or other suitable device, and while in such position I coat both the internal and external surfaces of the gun with plastic clay, so as to entirely insulate it from the atmosphere, and after such clay has become dry the truck, with the gun, is to be run into a furnace made for the purpose, and having a temperature such as will soon raise the metallic tubes of the gun to a red heat, or such a heat as will not allow the melted solder or metallic compound $g$, which is to be poured into the upper ends of the series $b\ c\ d\ e$ of tubes, to become chilled. The fluid metal or solder should be poured into such tubes until, aided by gravitation and attraction, it shall have permeated all the spaces between the series of tubes or rings and the central tube, and so as to form a solid mass of brass and iron after the same may have become cooled.

I claim—

An improved cannon or piece of ordnance as made with the breech $f$, the central tube, $a$, and one or more series of tubes or concentric cylinders, arranged and combined substantially as specified, the whole being united or brazed together in the manner substantially as set forth.

LEMUEL W. WRIGHT.

Witnesses:
FREDERICK CURTIS,
F. P. HALE, Jr.